3,207,903
UNIDIRECTIONAL ULTRAVIOLET
DETECTION SYSTEMS
Andre T. Abromaitis, Morristown, Albert Leen, West Caldwell, and John B. Johnson, Millburn, N.J., assignors to McGraw-Edison Company, Elgin, Ill., a corporation of Delaware
Filed May 10, 1963, Ser. No. 279,425
7 Claims. (Cl. 250—83.6)

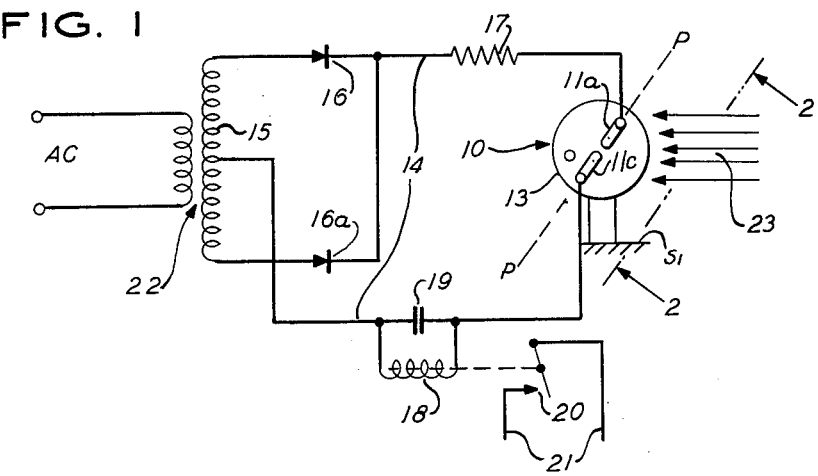
FIG. 1
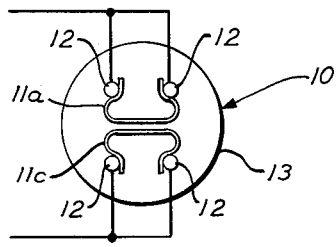
FIG. 2
FIG. 3
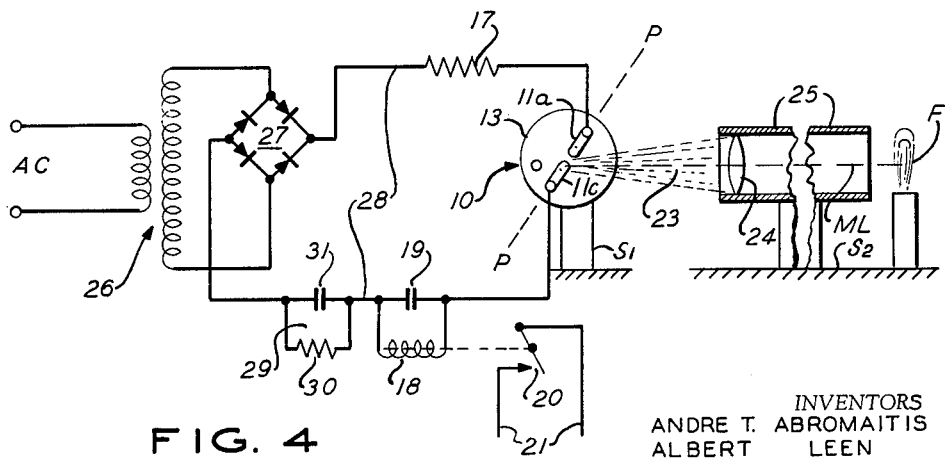
FIG. 4
INVENTORS
ANDRE T. ABROMAITIS
ALBERT LEEN
BY JOHN B. JOHNSON
George H. Fritzinger
AGENT

This invention relates to novel ultraviolet detector systems and, more particularly, to improved circuits and arrangements using ultraviolet detector tubes which enables the tubes to respond with higher sensitivity to unidirectional ultraviolet radiation.

The invention is especially applicable to ultraviolet detector tubes of the character described and claimed in the Howling Patent No. 3,047,761, dated July 31, 1962, and to the pending Johnson et al. application Serial No. 83,755, filed January 19, 1961, now abandoned. However, it is to be understood that no unnecessary limitation of the invention to such ultraviolet detector tubes is intended.

In the foregoing patent and application there is described an ultraviolet detector tube having electrodes with wire portions in an adjacent relationship forming a working region wherein the emission of an electron will trigger an avalanche dicharge when a firing potential is applied across the electrodes. Also, there is described the idea of working the ultraviolet detector tube in either an A.C. circuit or a pulsating D.C. circuit to quench the tube at the end of each voltage pulse (half-wave A.C. or D.C.) by reason of the applied voltage falling below a sustaining value sufficient to maintain a discharge. The advantage of such mode of operation is that the operating circuit can be designed for maximum power efficiency without limitation as to any quenching problem.

The present invention resides in the discovery that an ultraviolet detector tube worked in a pulsating D.C. circuit will have better sensitivity when the radiation is directed in a beam at an acute angle to the plane of the electrodes than is obtained when the radiation is omnidirectional or is directed in a beam at right angles to the plane of the electrodes. This invention has therefore great importance in applications where ultraviolet radiation is to be detected from a concentrated source positioned in a fixed spacial relationship to the ultraviolet tube. An example of such application is in boiler control systems where ultraviolet radiation is directed in a beam by a lens with or without a sighting tube from the source to the ultraviolet detector tube.

By orienting the detector tube so that the radiation beam is at an acute angle to the plane of the electrodes and so that the cathode is the farther from the source of the radiation almost the entire active surface of the cathode in the beam of the radiation also confronts the anode. The term "active surface of the cathode" is herein used to mean the area upon which the radiation falls and over which at the same time the electric field strength arising from the voltage impressed across the two electrodes is high enough to enable an electron emitted from this area to start an avalanche discharge. When the entire active surface area of the cathode from which electrons are emitted by incident photon radiation is in a line of sight with the anode the detector tube will respond to lower levels of radiation than is otherwise the case.

A further improvement in sensitivity is achieved in accordance with the invention by orienting the tubes so as to make the active portion of the cathode surface confronting the beam as large as possible, and by employing a lens system which will concentrate the beam from the ultraviolet source to a focal spot centered on this active area. By so focusing the beam the greater percentage of the ultraviolet flux is intercepted by the active surface area of the cathode to enable lower subsaturation levels of radiation intensity to trigger avalanche discharges and provide therefore a substantially higher effective sensitivity.

An object of the invention is, therefore, to provide new and improved ultraviolet detector systems which have a markedly increased sensitivity to unidirectional or beam sources of ultraviolet radiation.

Another object of the invention is to provide improvements in ultraviolet detector systems which are to be mounted in fixed spacial relationship to the source of ultraviolet radiation to be detected.

Another object is to use a focusing means in an ultraviolet detector system for utilizing an increased portion of the flux of a beam source of radiation for triggering the ultraviolet detector tube.

Another object is to provide such an improved ultraviolet detector system wherein a substantial part of the beam being detected is focused onto an active surface area of the cathode electrode confronting the anode electrode.

Another object is to provide in an ultraviolet detector system a lens for directing the light flux from an ultraviolet source onto the active surface area of a cathode electrode of an ultraviolet detector tube operated from a pulsating D.C. potential.

These and other objects and features of the invention will be apparent from the following description and the appended claims.

In the description of the invention reference is had to the accompanying drawings, of which:

FIGURE 1 is a schematic circuit diagram illustrating an embodiment of the invention wherein a beam of radiation is at an acute angle to the plane of the electrodes of a detector tube operated from a pulsating D.C. circuit;

FIGURE 2 is a fractional view taken on the line 2—2 of FIGURE 1 showing a preferred configuration of electrodes for the ultraviolet detector tube, as seen at right angles to the plane of the parallel portions of the electrodes;

FIGURE 3 is a cross-sectional view of the parallel portions of the electrodes shown to enlarged scale to illustrate the advantage of having the plane of the electrodes at an acute angle to the direction of the beam of ultraviolet radiation being detected;

FIGURE 4 is a schematic diagram illustrating a preferred embodiment of the invention wherein a focusing means is employed to direct a major part of the beam flux onto the active surface area of the cathode electrode;

Figure 5:
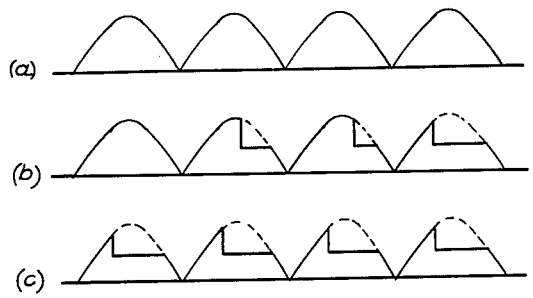
FIGURE 5 is a view showing the wave form of the voltage across the ultraviolet detector tube in the embodiment of FIGURE 4 for the condition of no incident radiation, moderate radiation and saturating radiation.

In the embodiment of the invention shown by FIGURES 1, 2 and 3 there is an ultraviolet detector tube 10 having two wire electrodes 11a and 11c of, for example, identical form, each provided with semicircular end portions turned away from each other and secured as by welding to respective supporting pins 12. The intermediate portions of the wire electrodes are in an adjacent parallel relationship forming a working region in which the emission of the electrons will trigger an avalanche discharge when a firing potential is applied across the electrodes. The electrodes are supported in a glass envelope 13 which is pervious to ultraviolet light. The envelope 13 is filled with an ionizing gas such as of pure hydrogen or of hydrogen with a noble gas or gases such as of helium, neon, krypton and/or xenon. The wire electrodes may, for example, be typically of the order of .017″ in diameter and be spaced .047″ from axis to axis of their parallel portions.

The firing potential for the detector tube 10 when the same is filled with pure hydrogen is of the order of 700 volts, and the sustaining voltage is then of the order of 330 volts. Thus, if such tube is subjected to incident photon radiation of a saturating level it will discharge at the instant the applied potential reaches 700 volts and the discharge will continue until the applied potential falls below 330 volts. This firing voltage will however depend on the gas pressure and the shape and material of the cathode electrode, and the sustaining voltage mainly on the cathode material for any given gas.

The ultraviolet detector tube 10 is connected in an operating circuit 14 which includes an A.C. source of potential 15, a pair of diodes 16 and 16a, a current-limiting resistor 17, the ultraviolet detector tube 10 and a load device 18 shunted by a filter condenser 19. The load device may comprise typically an electrical relay having a pair of contacts 20 connected in a control circuit 21. The voltage source may be a center tapped secondary winding of a step-up transformer 22 having its primary winding connected to an A.C. power line. The radiation to be detected is indicated as a beam 23 of unidirectional rays from an ultraviolet source not shown.

The rectifier diodes 16 and 16a constitute a full-wave rectifier which limits the potential applied across the electrodes to successive half-wave D.C. pulses to cause the electrode 11a to serve as anode and the electrode 11c to serve as cathode.

In accordance with the invention the ultraviolet detector tube 10 is fixedly mounted on a support $S_1$ (diagrammatically indicated) so that the parallel portions of the electrodes are at right angles to the ultraviolet rays of the beam 23 and the plane P—P of the parallel portions of the electrodes is at an acute angle as from 25° to 60° to the beam. Furthermore, the orientation is such that it is the cathode electrode 11c which is positioned the farther from the ultraviolet source. By this orientation the cathode 11c has a greater surface area which both intercepts the beam 23 and confronts the anode 11a than would be the case were the beam at right angles to the plane of the electrodes. This is apparent by reference to FIGURE 3 wherein the plane P—P of the electrodes is shown by way of example as being approximately 45° from the direction of the beam 23. The ultraviolet beam 23 here strikes a front half portion of the cathode 11c which is substantially all in a line of sight with the anode. By the tangent lines 26 drawn from the anode 11a to the opposite edges of the portion of the cathode intercepting the beam it is apparent that nearly the whole surface of the cathode in the path of the beam also confronts the anode. Since the surface areas of the electrodes confronting each other have the higher electric field and this irradiated surface area of higher field is increased by the present invention, the ultraviolet detector tube has a resultant markedly higher sensitivity. In other words, by the present invention the tube is operated in a manner to discharge and operate the load relay responsive to a lower level of incident photon radiation than is the case when the tubes are operated from an A.C. or pulsating D.C. potential source and the plane of the electrodes is at right angles to the beam of radiation to be detected.

The sensitivity of the present detector system is further enhanced in accordance with the present invention by a focusing means fixedly mounted on a support $S_2$, which will concentrate nearly the whole beam flux on an active surface area of the cathode as shown in FIGURE 4. The focusing means may comprise a lens 24 which may be used in connection with a sighting tube 25 on a medial line ML at an acute angle to the plane P—P of the electrodes. Since the medial line of the beam is at an acute angle to the plane of the electrodes nearly the entire surface of the cathode electrode intercepting the focal spot of the beam can face the anode electrode to be an active surface area from which the emission of an electron will trigger an avalanche discharge. Thus, nearly one hundred percent of the beam can be utilized to control the ultraviolet detector tube. If as a practical matter the beam is focused on a spot whose diameter is say twice as great as the diameter of the cathode electrode so that a critical adjustment of the lens relative to the ultraviolet detector tube is eliminated, still about sixty percent of the flux of the beam will be intercepted by the cathode electrode.

For efficient transmission through the sighting tube the inside surface should have a polished, mirror-like surface so that it is a good reflector for ultraviolet light. Then, nearly all of the radiation which enters the outer end of the pipe as from a flame F will issue at the detector end. The detector end then in effect becomes the source of radiation. Since the detector end can be brought close to the detector tube, say ½ inch from the electrodes, there occurs a corresponding increase in the intensity of the radiation which is incident on the tube. Since the light source can be chaotic and cover a wide frequency band the design of the sighting tube is not critical. When no focusing lens is used at the detector end the inside diameter of the sighting tube is made preferably equal to the length of the electrodes of the detector tube.

Only by way of a different illustrative example, a power transformer 26 is shown in FIGURE 4 having a single secondary winding (not tap) connected through a bridge rectifier 27 to the operating circuit 28 for the ultraviolet detector tube.

Since the detector tube 10 is operated in a D.C. circuit in the present invention, there may be connected directly in series therewith a safeguarding network 29 to permit the current-limiting resistor 17 to be reduced or eliminated whereby to increase still further the sensitivity of the detector tube to radiant flux at subsaturation levels as is taught by the pending Abromaitis application Serial No. 265,177, filed March 14, 1963, and issued July 20, 1965, as Patent No. 3,196,273. The safeguarding network 29 may consist simply of a resistor 30 and a parallel condenser 31. Such a network offers no hindrance to the initial flow of direct current in the operating circuit. When the fixed limiting resistor 17 is reduced or eliminated the system can respond initially to lower levels of flux radiation. However, were this initial condition maintained, the current flow could reach a sufficiently high level responsive to a radiant flux at a saturation level over a period of time to cause the electrodes to overheat to the point where they would emit electrons thermionically and lock on the tube—i.e., keep the tube discharging to each applied voltage pulse even after the radiation has ceased. The network 29 builds up a counter E.M.F. across the condenser 31 within a time period according to the time constant of the system, to prevent the discharge current reaching such value which could cause lock on of the tube.

In FIGURE 5a there are shown successive half-wave D.C. pulses representing the applied potential across the ultraviolet detector tube 10 when there is no incident radiation on the tube. In FIGURE 5b it is shown how the applied potential falls to the sustaining voltage at random discharge points during the applied voltage pulses when the ultraviolet radiation is at a subsaturation level. In FIGURE 5c it is shown how the applied potential drops to the sustaining level at each instant the applied pulse reaches a firing potential when the incident photon radiation is at a saturating level. In FIGURES 5b and 5c the difference in magnitude of the dotted lines completing the sinusoidal waves and the solid lines showing the actual voltage drop across the ultraviolet detector tube is a measure of the voltage applied across the circuit elements external to the tube.

Figure 6:
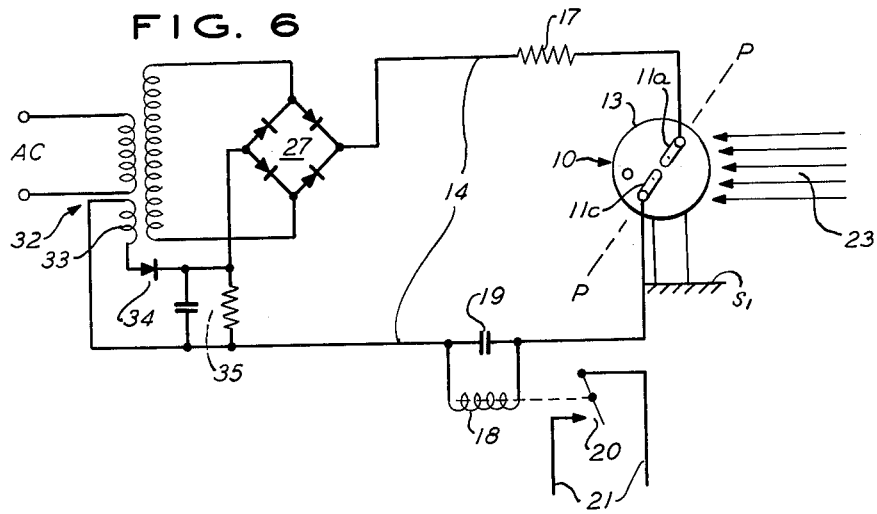
FIGURE 6 is a schematic circuit diagram illustrating another embodiment of the invention.

The embodiment of the invention shown in FIGURE 6 differs from the embodiment of FIGURE 4 particularly in that a power transformer 32 is used having a tertiary winding 33 connected through a half-wave rectifier 34 and an R.C. filter 35 in series with the operating circuit 14. The tertiary winding 33 and rectifier 34 are arranged to provide less than the sustaining 330 volts necessary for the detector tube 10 to remain conductive. If this bias voltage is set for example at 300 volts—i.e., 30 volts less than the sustaining voltages—then the peak voltage from the power transformer 32 to the full-wave rectifier 27 is set at 300 volts less than before. For example, a voltage supply from the secondary winding in the power transformer of 500 volts R.M.S.S instead of 700 vols R.M.S. would now be sufficient.

Figure 7:
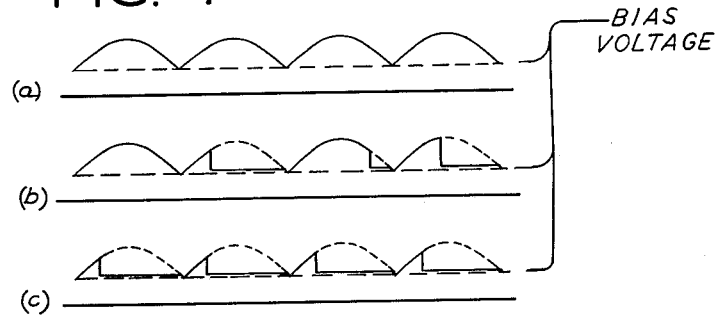
FIGURE 7 is a view showing the wave form of the applied voltage across the ultraviolet detector tube in the embodiment of FIGURE 6 for the conditions of no incident radiation, moderate radiation and saturating radiation.

In FIGURE 7 there is shown the wave form of the voltage applied across the ultraviolet detector tube 10 in the embodiment of FIGURE 6 respectively for the condition when the tube is not firing, when there is subsaturation radiation causing random firing and when there is saturated radiation causing firing during each applied voltage pulse. It is apparent by a comparison of FIGURE 7 with FIGURE 5 that the percentage of discharge time to nondischarge time during each voltage pulse is greater because the point where the firing potential is reached starts earlier and the point where the applied voltage falls below a sustaining value occurs later. Actually, the tube conduction time during each half cycle of applied voltage is increased by approximately fifteen percent to give a corresponding greater increase in tube sensitivity.

The embodiments of our invention herein particularly shown and described are intended to be illustrative and not limitative of our invention since the same are subject to changes and modifications without departure from the scope of our invention which we endeavor to express according to the following claims.

We claim:

1. A system for detecting a beam of ultraviolet radiation comprising an ultraviolet detector tube having two electrodes with adjacent parallel portions forming a working region wherein the emission of electrons responsive to incident photon radiation will trigger an avalanche discharge when a firing potential is applied across the electrodes, means for holding said ultraviolet detector tube in a fixed position relative to said beam with said parallel electrode portions at right angles to said beam and with the common plane through the axes of said parallel electrode portions at an acute angle to said beam, an operating circuit for applying a pulsating D.C. potential across said electrodes of a magnitude equal at least to said firing potential and of a polarity causing the electrode which is the farther from the source of radiation to operate on a cathode, and a load device in said circuit operable by discharge current through said ultraviolet detector tube.

2. The detector system set forth in claim 1 wherein said common plane of the electrodes is at an angle from 25° to 60° to the direction of said beam.

3. The detector system set forth in claim 1 wherein said operating circuit is connected to a source of A.C.

potential and includes a full-wave rectifier for supplying successive half-wave D.C. voltage pulses across said electrodes.

4. The detector system set forth in claim 1 including a current-limiting network in series with said load device for building up counter E.M.F. responsive to successive pulses of direct current flow through said tube whereby to limit the maximum steady state flow of discharge current through the tube when the tube is subjected to saturation levels of radiation.

5. A system for detecting a beam source of ultraviolet radiation comprising a pair of wire electrodes having parallel portions in an adjacent relationship providing a working region wherein emission of electrons is effective to trigger an avalanche discharge when a firing potential is applied across said electrodes, means in a fixed relation to said beam for supporting said ultraviolet detector tube in a position wherein said parallel electrode portions are at right angles to said beam and the common plane through the axes of said parallel electrode portions is at an acute angle to said beam with one of said electrodes being spaced farther than the other electrode from the source of the radiation to be detected than the other electrode, and an operating circuit for applying a pulsating D.C. potential across said electrodes of a polarity causing said one electrode to operate as a cathode.

6. A system for detecting a beam of ultraviolet radiation comprising an ultraviolet detector tube having two electrodes with adjacent parallel portions forming a working region wherein emission of the electrons responsive to incident photon radiation will trigger an avalanche discharge when a firing potential is applied across the electrodes, means for applying a pulsating D.C. potential of at least said firing potential across said electrodes to cause a predetermined one of said electrodes to operate always as cathode, and focusing means for directing an increased portion of the flux of said beam into a focal spot intercepted by said cathode electrode.

7. The detecting system set forth in claim 6 wherein said parallel portions are cylindrically shaped, including means for holding said ultraviolet detector tube oriented relative to said focusing means so that the plane of the electrodes is at an acute angle to the medial line of the beam and the cathode electrode is spaced farther than the other electrode from the source of the radiation to be detected, and wherein the portion of the cathode surface intercepting said beam is an active surface area facing the anode electrode of the ultraviolet detector tube.

References Cited by the Examiner

UNITED STATES PATENTS

| 2,058,941 | 10/36 | Arnhym | 250—77 |
| 2,824,237 | 2/58 | Witzel | 250—83.6 |
| 2,924,152 | 7/60 | Johnson | 250—83.6 |
| 2,959,679 | 11/60 | Powell | 313—93 X |
| 2,984,747 | 5/62 | Walker | 250—83.3 |
| 3,028,495 | 4/62 | Rankin | 250—83.6 |
| 3,041,458 | 6/62 | Roxberry | 250—83.3 |

RALPH G. NILSON, *Primary Examiner.*

JAMES W. LAWRENCE, *Examiner.*